United States Patent [19]

Grazioli et al.

[11] Patent Number: 5,201,834
[45] Date of Patent: Apr. 13, 1993

[54] METHOD FOR THE TESTING AND MONITORING OF BRAKES IN RAIL VEHICLES

[75] Inventors: Mario Grazioli, Chur; Kurt Anderegg, Rheineck, both of Switzerland

[73] Assignee: Inventio AG, Hergiswil, Switzerland

[21] Appl. No.: 876,111

[22] Filed: Apr. 27, 1992

Related U.S. Application Data

[63] Continuation of Ser. No. 504,577, Apr. 4, 1990, abandoned.

[30] Foreign Application Priority Data

Apr. 5, 1989 [CH] Switzerland ............... 01258/89

[51] Int. Cl.⁵ .................. B61L 23/02; G01L 5/28
[52] U.S. Cl. ..................... 246/169 R; 246/167 R; 340/505
[58] Field of Search .................. 340/500, 505; 364/424.01, 424.03, 424.04; 246/167 R, 169 R, 169 A, 169 D, 191; 188/1.11, 79.51, 264 R; 303/DIG. 3

[56] References Cited

U.S. PATENT DOCUMENTS

| | | | |
|---|---|---|---|
| 1,183,031 | 5/1916 | Price | 188/1.11 X |
| 2,638,864 | 5/1953 | Beck | 246/169 R X |
| 2,802,935 | 8/1957 | Swander, Jr. et al. | 246/167 R |
| 3,768,598 | 10/1973 | Pollinger et al. | 188/1.11 |
| 3,838,272 | 9/1974 | Bull | 246/169 R |
| 3,871,718 | 3/1975 | Wurth | 303/DIG. 3 X |
| 4,041,470 | 8/1977 | Slane et al. | 246/169 R X |
| 4,361,825 | 11/1982 | Shockley | 303/DIG. 3 X |
| 4,443,784 | 4/1984 | Franzen et al. | 246/169 R X |
| 4,487,060 | 12/1984 | Pomeroy | 246/169 R X |
| 4,491,290 | 1/1985 | Douglas | 246/169 A |
| 4,718,622 | 1/1988 | Rahman | 246/169 |
| 4,805,740 | 2/1989 | Wilke et al. | 188/1.11 X |
| 4,817,019 | 3/1989 | Morihara | 364/550 |
| 4,845,468 | 7/1989 | Stark | 188/1.11 X |
| 4,937,554 | 6/1990 | Herman | 188/1.11 X |
| 4,947,036 | 8/1990 | Pokorski et al. | 250/226 |
| 4,964,679 | 10/1990 | Rah | 188/1.11 X |

FOREIGN PATENT DOCUMENTS

2588077 4/1987 France .

*Primary Examiner*—Michael S. Huppert
*Assistant Examiner*—Scott L. Lowe
*Attorney, Agent, or Firm*—William J. Clemens

[57] ABSTRACT

A method for performing operationally prescribed brake trials before the departure of a railway train, utilizes an indicating and diagnostic system disposed on board the train and operated by the train driver. Sensors in the braking system of each car bogie supply information signals representing pressures, travels and forces to a bogie processor which is connected with a car processor. The car processors are connected by a continuous data bus line with a central processor. The central processor processes the operational information from the brake system according to a processing program into status reports such as general status indications, fault diagnoses and maintenance instructions. The indications and instructions are visually displayed on a monitor and a printer, and acoustically reproduced by a speech synthesizer through a loudspeaker. The car processors are programmable by means of mobile computers and interrogatable by means of pocket terminals. Stored operational data is interrogable from outside each railway car by means of a mobile personal computer at each railroad vehicle.

5 Claims, 4 Drawing Sheets

METHOD FOR THE TESTING AND MONITORING OF BRAKES IN RAIL VEHICLES

This application is a continuation of U.S. patent application Ser. No. 07/504,577, filed Apr. 4, 1990, and now abandoned.

BACKGROUND OF THE INVENTION

The present invention relates generally to railroad vehicles and, in particular, to a method and apparatus for testing and monitoring railroad vehicle brakes.

Monitoring systems have been utilized with many devices such as for the control of air conditioning appliances and of doors, as well as for protection against skidding and the detection of flat spots on vehicle wheels, and for railroad trains. U.S. Pat. No. 4,781,622 discloses a central fault indicating system for a railroad train in which nine different functions are indicated by centrally arranged signal lamps for a maximum of fifteen cars. A functional relay system on each individual car is interrogated periodically and the failure of a function in one or more cars is indicated by lighting the associated signal lamp in the lead car. For the brakes, the release and pulling-up movement is acknowledge. Through the arrangement of one hundred thirty-five (nine functions times fifteen cars) signal lamps in the lead car, a coarse localization of a failed function is possible when a breakdown occurs. The system utilizes standard hardware and known digital communication techniques. However, it is not possible to exercise active and differentiated control of the test functions from the central location in the lead car. Only a single digit measurement magnitude without qualitative content is present for each function and the self-test is restricted to the testing of the signal lamps. A diagnostic function is not present and individual cars which are detached from the train cannot be tested.

SUMMARY OF THE INVENTION

The present invention concerns a method and an apparatus for testing and monitoring the operational state of the braking system of railroad vehicles whereby the operational state is indicated continuously. The performance of the conventional brake trial, which is intensive in personnel and time, becomes superfluous. Taking its place is the checking of the status reports, which checking can be performed along and rapidly at any time by the train crew personnel. Through the quantitative detection of several brake functions, the degree of safety of the automatic checking increases. The brake lining wear is monitored continuously and can be interrogated at any time. The replacement of the linings can be matched better train by train and with other upkeep operations. Faults in the braking system can be localized and eliminated more rapidly. Differences in the braking performances of individual cars are recognized and can be eliminated in a targeted manner to improve traveling comfort through a reduction in the accordion affect under braking.

False measurements due to defective sensors are recognized by the system thereby leading to conservative reports on the safety of the cars. The quantitative monitoring of the hand brake prevents wheel wear and provides an improvement in the safety of parked vehicles militating against rolling away.

The method for the testing and monitoring of brakes of railroad vehicles individually and coupled together in a train comprising the steps of: monitoring functions at predetermined points in a railroad vehicle braking system from a central location to obtain information as to the status of said functions; indicating from the central location the status of each of the monitored functions; and processing the information as to the status of the monitored functions and generating outputs including at least one of travel clearance reports, fault diagnoses in the case of faults, orders and instructions for fault elimination, and advisories for maintenance operations that are due, the outputs being issued in preselected optical, script and acoustical form. The monitoring step can be performed by providing sensors at the predetermined points for generating information signals to the central location representing the status of the braking system functions including information as to forces, pressures, travels, temperatures and wear.

The apparatus for the testing and monitoring of brakes of railroad vehicles individually and coupled together in a train includes a plurality of sensors mounted at predetermined points in the braking system of a railroad vehicle for sensing information and generating information signals representing values of travel, pressure, force, wear and temperature, and a bogie processor having inputs connected to the sensors for reading, storing and outputting the information signals for an associated bogie of the railroad vehicle. A car processor is connected with the bogie processors in a car by a continuous data bus line, the data bus line being provided with terminals at both ends for connection to the car processors in the other cars in a train. A central computer installed in a driving car railroad vehicle in the train is connected to the data bus line for performing as a central processor and has a keyboard, a monitor, a data carrier, a printer, a loudspeaker, inputs and a standard interface.

It is an object of the present invention to provide an apparatus to rationalize the prescribed method of testing the brakes of rail vehicles in trains assembled as desired.

It is another object of the present invention to provide a method and apparatus for reducing the maintenance effort for rail vehicles, in particular for the braking systems of rail vehicles.

It is a further object of the present invention to provide a method and apparatus for increasing the safety of the braking systems of rail vehicles.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
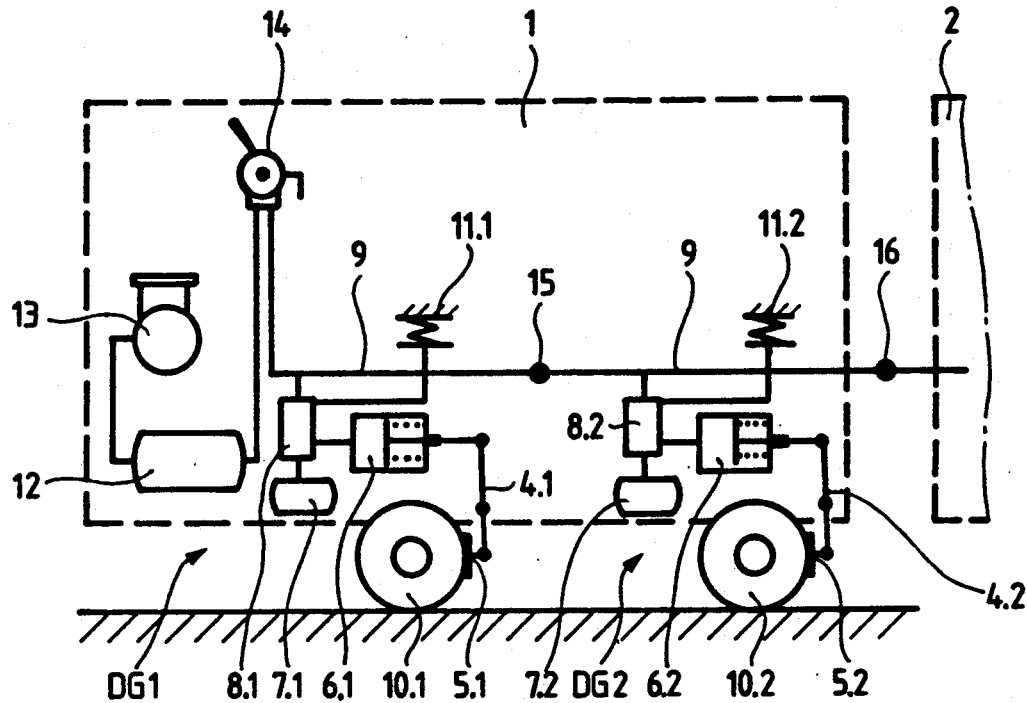
FIG. 1 is a schematic view of a rail vehicle braking system to which a testing and monitoring apparatus according to the present invention can be connected.
Figure 2:
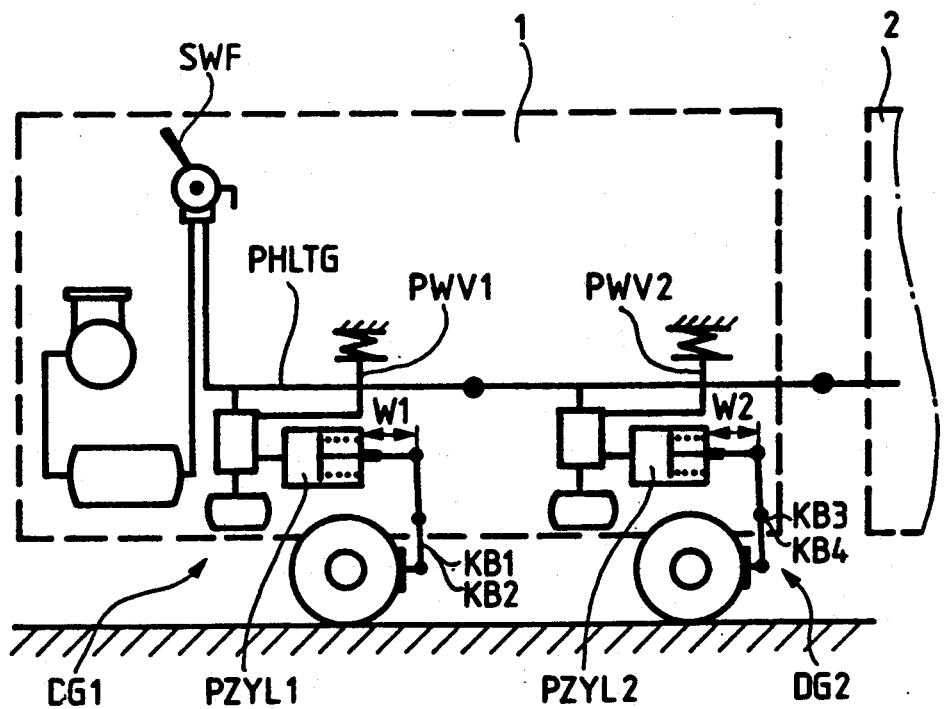
FIG. 2 is a schematic view of the braking system shown in FIG. 1 indicating the measuring points for the testing and monitoring apparatus according to the present invention.
Figure 4:
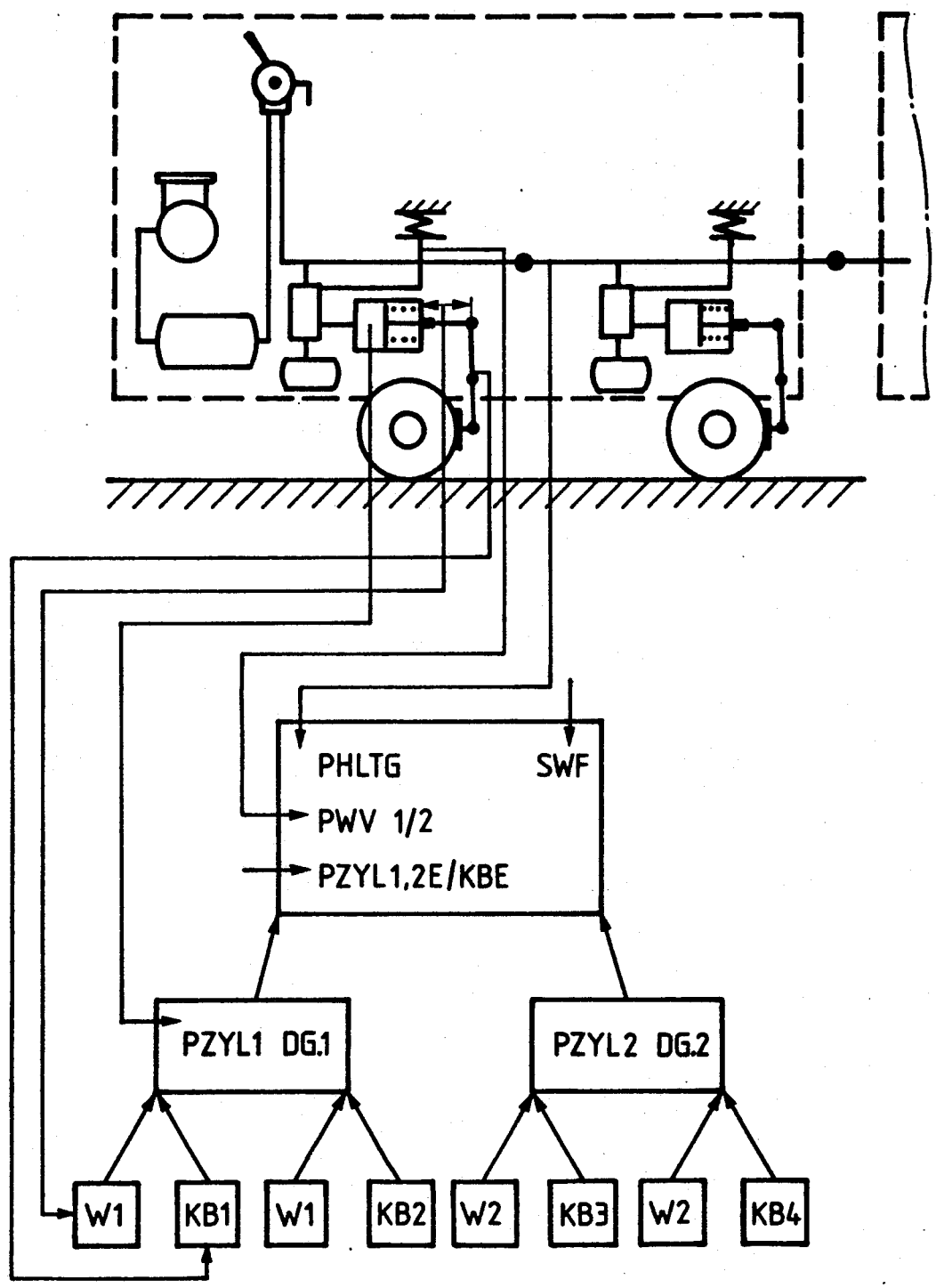
FIG. 4 is a combined schematic view and block diagram of the measurement design for the method and apparatus according to the present invention.

The braking systems illustrated in FIGS. 1, 2 and 4 relate to a typical railroad vehicle having two bogies or swiveling railway trucks each having two axles. In FIG. 1, such a rail vehicle is denoted by 1 and a second such rail vehicle 2 is coupled with the first rail vehicle 1. A bogie DG1 is attached to the vehicle 1 and has wheel sets 10.1 (representing two axles although only one is shown) with associated brake shoes 5.1. A brake linkage 4.1 is coupled to a pneumatic system for the bogie DG1. The pneumatic system includes a brake cylinder 6.1 having a piston attached to the linkage 4.1, and a brake valve 8.1 connected to an auxiliary air tank 7.1 and to a rocker valve 11.1. Similarly to the bogie DG1, a second bogie DG2 is attached to the vehicle 1 and has wheel sets 10.2 (two axles although only one is shown) with associated brake shoes 5.2. A brake linkage 4.2 couples the bogie DG2 to a pneumatic system having a brake cylinder 6.2, a brake valve 8.2, an auxiliary air tank 7.2 and a rocker valve 11.2

A main air line 9 has an air line coupling 15 connected between the bogies DG1 and DG2 and a further air line coupling 16 connected between the rail vehicles 1 and 2. The rail vehicle 1 can be a driving car or a locomotive and, therefore, includes a compressor 13 for generating compressed air connected to a main air tank 12 and a driver brake valve 14 connected between the tank 12 and the line 9.

In FIG. 2, there are shown the various measurement locations in the braking system for providing information to the testing and monitoring apparatus according to the present invention. The measurement quantity symbols and definitions are:

KB1—Braking force at the first wheel set in the bogie DG1
KB2—Braking force at the second wheel set in the bogie DG1
KB3—Braking force at the first wheel set in the bogie DG2
KB4—Braking force at the second wheel set in the bogie DG2
PHLTG—Pressure in the main air line 9
PWV1—Superimposed rocker valve pressure of the bogie DG1
PWV2—Superimposed rocker valve pressure of the bogie DG2
PZYL1—Pressure in the brake cylinder 6.1 of the bogie DG1
PZYL2—Pressure in the brake cylinder 6.2 of the bogie DG2
SWF—Target value pressure for the driver brake valve 14
W1—Travel at the brake cylinder 6.1 in the bogie DG1
W2—Travel at the brake cylinder 6.2 in the bogie DG2

Figure 3:
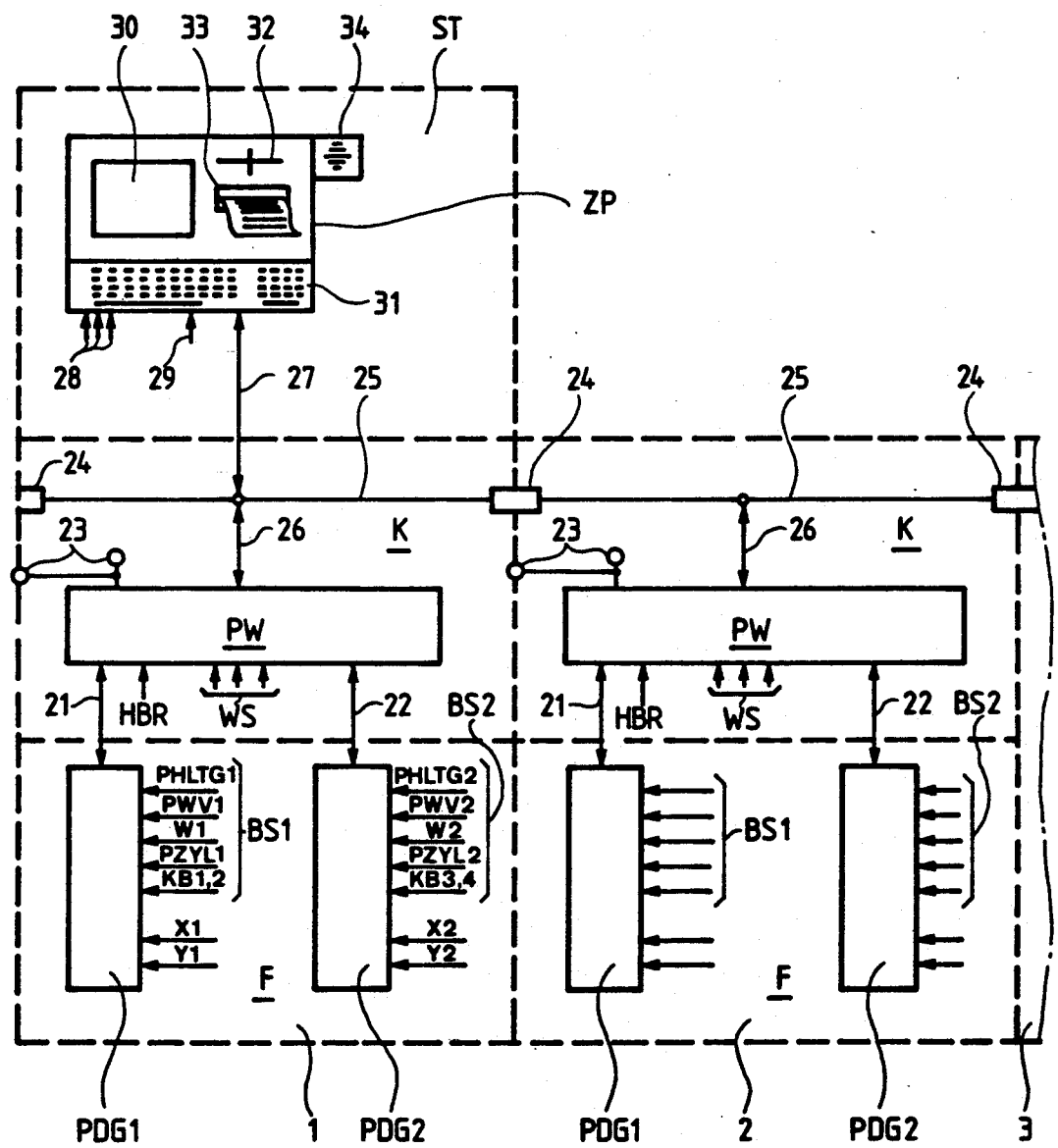
FIG. 3 is a combined schematic view and block diagram of the testing and monitoring apparatus according the present invention.

The railroad vehicles 1 and 2, and a similar third railroad vehicle 3 coupled to the vehicle 2, are shown in block diagram form with the monitoring and testing apparatus in FIG. 3. The railroad vehicles 1 and 2 are each subdivided into an undercarriage portion F and a body portion K. A control portion ST of the monitoring and testing apparatus is linked with the rail vehicle 1 which is a control car or a locomotive. In the undercarriage portion F of each of the rail vehicles 1, 2, 3 ... n coupled together in a train, a bogie processor PDG1 is associated with the first bogie DG1 and a bogie processor PDG2 is associated with the second bogie DG2. The bogie processors PDG1 and PDG2 have measurement location inputs BS1 and BS2 receptively from the measurement locations shown in FIG. 2. The inputs X1, X2, Y1 and Y2 are connections for additional measurement locations which can be provided but are not described herein. A data line 21 and a data line 22 connect the bogie processors PDG1 and PDG2 respectively with a car processor PW. The car processors PW of the rail vehicles 1, 2, 3 ... n are each connected by a data line 26 with a common data bus line 25. Portions of the bus line 25 are located in the individual rail vehicles and are connected to one another by a data bus coupling 24 at the adjacent ends.

Car system sensors WS are inputs to the car processors PW and a standardized interface 23, which is accessible onboard and off-board, it also connected to the car processors. An input HBR to the car processor PW reports the setting of the hand brake in each car. A central processor ZP, which is connected by way of a data line 27 with the data bus line 25, is located in a control portion sT of the car 1. The inputs for the central processor ZP are through a standardized interface 29 from a keyboard 31 and/or a data carrier 32. A display screen 30, a printer 33 and a loud speaker 34 are provided as output devices. Data inputs 28 are provided for connecting to systems not described herein.

The relationships of the measurement quantities, at the locations which have been identified in FIG. 2, to one another are shown in FIG. 4. The linkage travels W1 and W2, as well as the braking forces KB1 and KB2, are in a fixed subordinate relationship to the cylinder pressure PZYL1 of the bogie DG1. The same relationship applies to the bogie DG2 with respect to the magnitudes of the measurement quantities W3, W4, KB3, KB4 and PZYL2. The brake cylinder pressures PZYL1 an PZYL2, in turn, are in a further defined subordinate relationship to the main air line pressure PHLTG and to the load-dependent rocker valve pressures PWV1 and PWV2, respectively. The target value SWF for the driver brake valve, obtained from the setting of the driver brake valve 14, is sued for the determination of the target values PZYL1E and PZYL2E for the brake cylinder pressures as well as for the computation of the target value KBE for the braking force.

Figure 5:
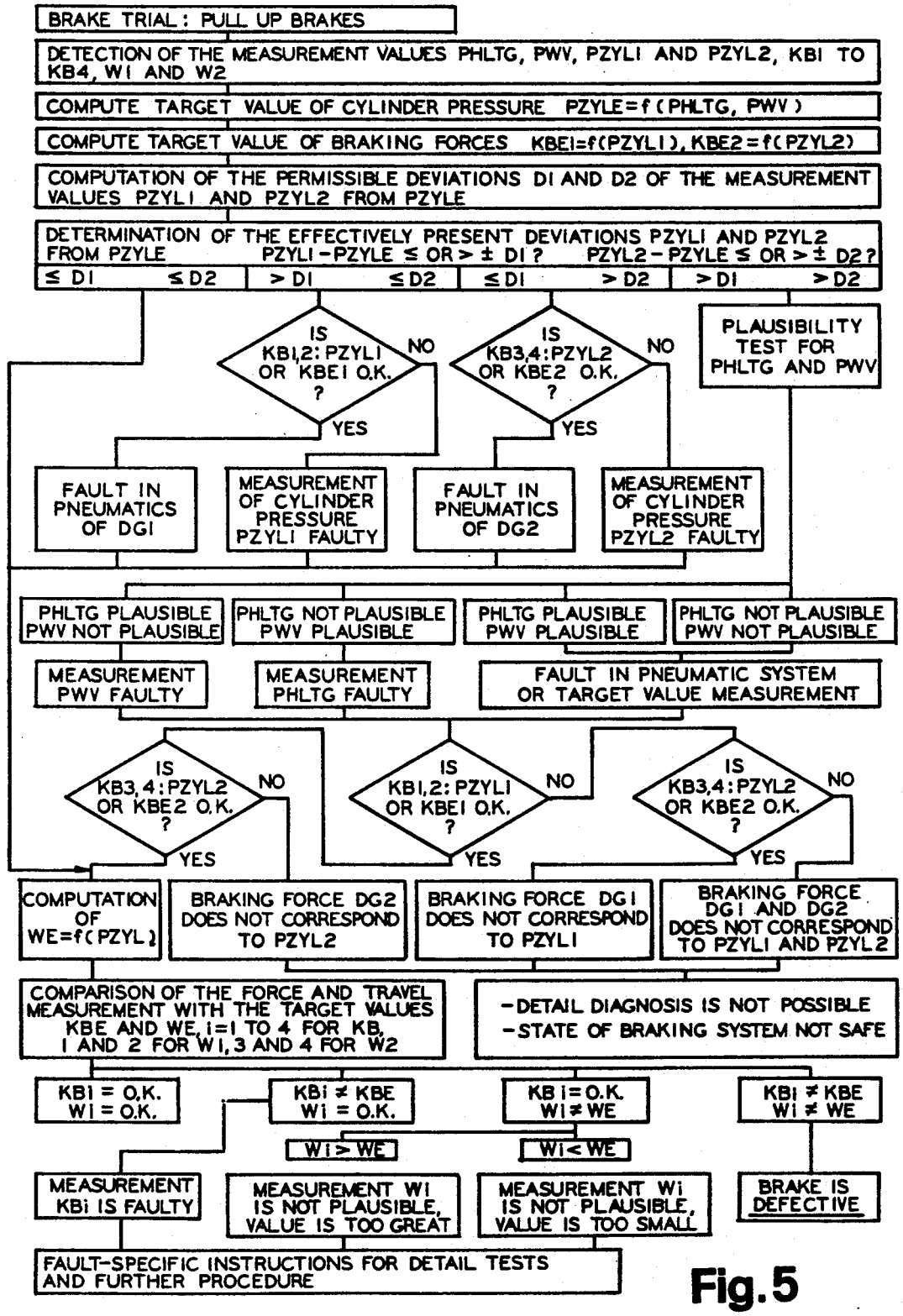
FIG. 5 is a block diagram of the diagnostic functions of the method performed by the apparatus according to the present invention.

FIG. 5 shows the functions of the apparatus diagnostic system, in a brake trail by way of example, in the form of a flow diagram. Details of the method and the arrangement of the above described equipment are explained below. The measurement locations shown in FIG. 2 are equipped with appropriate sensors adapted to the rough operation conditions of railway cars. The measurement sensors for the braking forces KB1 through KB4 typically are welded-in strain gauges which, for example, change their ohmic resistance proportionally to the bending of the brake lever from which changes in the magnitudes of the respective braking forces are derived.

The linkage travel measurement locations for W1 and W2 are equipped with linear travel transmitters which generate different signals. The simplest signal concerns the determination as to whether the associated position moves in the brake cylinders 6.1 and 6.2. A further signal represents the actuating travel W1 and W2 and thus informs about the play between the brake shoe and the wheel or disc. On the one hand, the readjustment functions of an automatic linkage are evident from the longer term travel/time diagram and, on the other hand, the amount of the wear of the brake shoe or the brake lining is evident from the sum of the readjustment travels. The latter measurement makes the installation of brake lining thickness sensors superfluous.

Pressure transducers measure the instantaneous air pressure in the main duct 9 at the measurement location for the air pressure PHLTG, in the brake valves 8.1 and 8.2 for the pressures PZYL1 and PZYL2 respectively, and in the rocker valve 11.1 for the pressures PWV1 and PWV2 respectively and convert the measured pressures into electrical values. The measurement locations provided for each of the bogies DG1 and DG2 form the measurement location inputs BS1 and BS2 respectively to the bogie processors PDG1 and PDG2 respectively. Additional data inputs X1 and Y1, or X2 and Y2 for example, can be connected with heat and/or vibration measurement locations not shown.

The data lines 21 and 22 connect the bogie processors DG1 and DG2 with the car processor PW in the body portion K of each of the rail vehicles 1, 2, 3 . . . n. The car processor PW is installed in the rail vehicle at an easily accessible place, for example in a platform sector. The car processor PW also has the additional inputs WS, which inputs serve to exchange data with the various body portion systems such as air conditioning, doors, illumination, battery network, loudspeaker, fire alarm and so forth. Not illustrated are reserve inputs intended for subsequent extension of the monitoring and diagnosis system. The standardized interface 23, for example an RS 232 interface, serves to communicate with a mobile computer or with a main computer installed on a railway station platform and functioning as the central processor ZP. The standardized interface 23 is accessible in the interior of the car as well as from the outside in the case of closed doors.

The communication capability serves to call up data of a preceding operational period for use in the present, to perform different system tests and, if need be, to undertake changes in the processing and storage program of the car processor PW. In the system tests, apart from the program, the braking force of the hand brake, the state of the battery network, as well as status signals of other car systems can be called up. In this manner, the braking systems and the additional technical equipment can be tested at individual rail vehicles without being coupled to locomotive, and possible faults in the braking and other systems can be recognized before assembling a train.

A mobile computer in the simplest form can be small data reading device, a so-called "pocket terminal", and otherwise can be a personal computer equipped with all the necessary peripheral devices. The on-board computer functioning as the central processor ZP is located in the driver's cabin of the locomotive or the control car. The central processor is permanently connected by way of the data line 27 with the continuous data bus line 25. Apart from all the above named communicative function, an important purpose of the method and apparatus according to the present invention is in replacing the previous operationally prescribed brake trials, such as pacing along the train, knocking the brake shoes with a hammer, or reading-off of the individual indications in the case of disc brakes. In the case of possible faults detected during the brake trial function, it is important to know the cause and how one is to proceed. Such information is supplied by the diagnostic system as a component of the data processing program stored in the central processor ZP.

Before the diagnostic program is described, the function of the pneumatic train brake shall be explained briefly. The basic manner of operation is evident from FIGS. 1, 2 and 4. In the released setting, the main air line 9 and the auxiliary air tanks 7.1 and 7.2 are filled. The return springs in the brake cylinders 6.1 and 6.2 are not loaded and thus lift the brake shoes from the wheel or from a brake disc. When the main air line 9 is exhausted by way of the driver brake valve 14, air flows from the auxiliary tanks 7.1 and 7.2 by way of the brake valves 8.1 and 8.2 respectively into the brake cylinders 6.1 and 6.2 respectively. The greater the reduction in air pressure in the main line 9, the greater are the brake cylinder pressures PZYL1 and PZYL2 and the braking forces KB1 through KB4 at the brake shoes 5.1.

The pressure PHLTG in the main air line 9 functions as a setting or input magnitude. The brake cylinder pressures PZYL1 and PZYL2, the shoe braking forces KB1 through KB4, and the setting travels W1 and W2 represent output magnitudes or braking effects. In many cases, the harder a rail vehicle must be braked, the higher is the weight of the loading. Then load braking, wherein a second control pressure PWV1 and PWV2 from the rocker valves 11.1 and 11.2 respectively is superimposed on the main line pressure PHLTG, is utilized.

The basic principle of the diagnostic method according to the present invention is to determine the target value KBE of the braking force which corresponds to a certain setting of the driver brake valve 14, and to compare this target value with the measured effective braking force values. In that case, several equivalent magnitudes, which stand in mutual dependence, are detected. On the assumption that only one faulty measurement can occur at any instant, status reports on the braking system, as well as on the diagnostic system itself (self-diagnosis), can be generated through the application of the majority principle.

The apparatus according to the present invention permits the process of the brake trail to be performed by the driver or conductor personnel on board the train to be tested. A brake trial operation consists of at least one pulling-up and releasing of the brakes. The functional operation of a diagnosis on the pulling-up of the brakes is illustrated in the flow diagram of FIG. 5. The diagnosis method begins with the positioning of the driver brake valve 14 at the setting of full braking force. After a reaction time due to the system inertia, the measurement values PHLTG, PWV (PWV1 and PWV2), PZYL1 and PZYL2, KB1 to KB4, and W1 and W2 are read from each vehicle in the train and the target values PZYLE, KBE1 and KBE2 are computed accordingly. After the computation of permissible deviations D1 and D2 of the measurement values PZYL1 and PZYL2 from PZYLE, the effectively present of permissible deviations are ascertained in the next step.

Four possibilities can result. The first possibility is that the deviations of the measurement values PZYL1 and PZYL2 are smaller or equal to the permissible deviations D1 and D2 from PZYLE. In this case, the braking system with pulled-up or actuated brakes is in order. The second possibility is that the deviation of the measurement value PZYL1 is greater than the permissible deviation D1 from PZYLE and PZYL2 does not deviate by more than D2 from PZYLE. In this case, the ratio of the braking forces KB1 and KB2 to PZYL1 or to KBE1 is tested. In the case of positive result, a pneumatic disturbance must be present in the bogie DG1 and the cylinder pressure measurement PZYL1 is faulty in the other case. The corresponding indication at the monitor as well as a corresponding protocol print-out take place. The third possibility shows an analogous occurrence to the second possibility, but with the difference that it concerns the bogie DG2. In the fourth possibility, it is ascertained that both cylinder pressures PZYL1 and PZYL2 deviate by more than the permissible amount from the target value PZYLE.

Apart from a checking of the target values, a plausibility test of the measurement values PHLTG, PWV (PWV1 and PWV2) is undertaken as follows. Four possibilities again result. The first two yield the statement that the measurement PWV or the measurement PHLTG is faulty and, in the third and fourth possibilities, both diagnose a fault in the pneumatic system or in the target value measurement. However, these statements are not final. The relationships of the braking forces KB1 to KB4 to PZYL1 and PZYL2, or to KBE1 and KBE2 are tested bogie by bogie. In three cases, the statements that result from this test are that the braking forces of the bogies DG1 or DG2, or of both bogies DG1 and DG2, do not correspond to the PZYL1 or PZYL2, or to PZYL1 and PZYL2 target values respectively.

If such results are present, a detailed diagnosis is not yet possible, but one knows that the status of the braking system is no safe and one will repeat the brake trial. In the case of a positive outcome, a comparison of the force and travel measurements KB1 to KB4 and W1 and W2 with the target values KBE and WE is undertaken after an intermediate computation of the relationship of the target travel values WE - f(PZYL). Of the four possible outcomes, three lead to the determination that the measurement of the force or travel sensors is faulty. Appropriate instructions for tests at the faulty measurement locations are issued for the expert mechanic. The status reports of such a brake diagnosis method replace a conventional brake check completely and are more meaningful.

The status report "braking system in order" means that: pressures, corresponding in magnitude to their target values, have built up in all brake cylinders of a railroad vehicle or all the vehicles of a train; contact pressure forces, corresponding to the target values, have built up at all brake shoes; all brake linkages have carried out movements for distances corresponding to the target values; and the response times correspond to the prescribed target values.

A brake trial is good when the status report "brakes in order" is present for all rail vehicles in a train. An approval excludes: too small a braking performance; an ice wedge between brake shoe and brake disc; a blocked brake linkage due to foreign bodies; and poor efficiency of the linkage due to defective lubrication.

In the case of an individual sensor defect, the status report reads, for example: braking function assured; and pressure sensor of the brake cylinder in bogie DG1 or DG2 of the car "n" is defective.

If two sensors are defective in the same bogey, the corresponding braking system is signalled as faulty in order to assure safety.

The monitoring of the hand brake is by a limit switch which reports the actuation of the hand brake and by the shoe force measurements KB1 to KB4. The status report "hand brake pulled up" is generated when a hand brake mechanism is actuated, the pneumatic brake is released and the shoe force has reached a certain limit value. This situation represents the normal state for a parked rail vehicle. A pulled-up hand brake, during the brake trial of a train ready for departure, generates a force which is superimposed on the pneumatically produced braking force and which together with the actuating signal of the corresponding hand brake introduces a departure block. The hand brake monitoring proves to be very useful, in particular in travel operation, and prevents the creation of flat spots on the car wheels.

The generation of the status reports at the central processor can be in optical, acoustical or script form. Typically, a travel clearance is indicated optically and acoustically after the brake trial, whereas a protocol printout is used in the case of faults or special tests. Details of the output mode are regulated primarily by appropriate operating regulations.

The monitoring and diagnostic system according to the present invention offers a series of further advantages and possibilities. Thus, the brake lining wear is monitored continuously and can be called up at any time. The replacement of the linings can be matched better train by train and with other upkeep operations. Faults in the braking system can be located and eliminated more rapidly. Differences in the braking performances of individual cars can be recognized and eliminated, which results in better traveling comfort due to a smaller accordion effect.

In an expanded form of the central indicating and diagnostic system shown in FIG. 3, changes considered to be important in the operational and status data are made known to the conductor personnel over a loudspeaker 34, for example, during travel by way of speech synthesizers. In a simpler form of the audio signal, desired acoustic signals are generated which signify corresponding instructions and/or warning.

The capacity and speed of processing of the central processor ZP must be sufficient to process status and operating data of all technical systems of a train in the same manner as described. The monitoring or car processors PW, which require a certain degree of safety, are backed-up in terms of hardware and software.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for the testing and monitoring of brakes of railroad vehicles individually and coupled together in a train comprising the steps of;

placing sensors at predetermined points in a railroad vehicle braking system to obtain information as to the status of a braking system function at each said point, said information being generated as information signals by said sensors;

storing said information signals for each bogie of the railroad vehicle in a bogie processor mounted in the railroad vehicle;

reading said information signals from said bogie processors and storing said information signals related to a predetermined operational period in a car processor mounted in the railroad vehicle;

selectively reading said information signals stored in said car processor, performing diagnostic tests on said information signals to generate test results and storing said test results; and issuing status reports representing said test results, said status reports including faulty sensor reports, travel clearance reports, braking system fault diagnoses reports, orders and instructions for fault elimination and advisories for maintenance operations that are due.

2. The method according to claim 1 including placing sensors at said predetermined points for generating information signals representing the status of the braking system functions including information related to at least one of forces, pressures, travels, temperatures and wear sensed in the braking system.

3. The method according to claim 1 including placing a sensor for detecting brake linkage travel of a brake linkage attached to a brake shoe in the braking system and generating a brake linkage travel information signal each time the braking system is actuated, calculating the wear of the brake shoe through a cumulative addition of differences between each one of said brake linkage travel information signals and the immediately preceding one of said brake linkage travel information signals; and issuing an advisory before a minimum thickness of the brake shoe is reached represented by a target brake linkage travel of said cumulative addition of differences.

4. The method according to claim 1 including placing sensors for detecting and generating information signals for main air line pressure, rocker valve pressure, brake cylinder pressure, braking force and brake cylinder travel in the braking system; calculating target values for brake cylinder pressure, braking forces, permissible deviations of said brake cylinder pressure from the brake cylinder pressure target value and brake linkage travel, and determining deviations by comparing said information signals with said target values and by performing plausibility tests on said information signals; issuing an associated one of a plurality of maintenance advisories in response to one of said determined deviations indicating a maintenance procedure is due, and issuing an associated one of a plurality of fault diagnoses in response to said one determined deviation indicating a braking system fault.

5. The method according to claim 1 including performing a braking system test by pulling-up and releasing the braking system; selectively reading said information signals stored in said car processor during said braking system test; performing diagnostic tests on said information signals to generate test results and storing said test results; and issuing status reports representing said braking system test test results, said status reports including faulty sensor reports, travel clearance reports, braking system fault diagnoses reports, and orders and instructions for fault elimination.

* * * * *